(12) United States Patent
Feng et al.

(10) Patent No.: US 12,113,452 B2
(45) Date of Patent: Oct. 8, 2024

(54) POWER SUPPLY CONTROL CIRCUIT AND CONTROL METHOD FOR SWITCHING POWER SUPPLY SYSTEM

(71) Applicant: Southchip Semiconductor Technology (Shanghai) Co., Ltd., Shanghai (CN)

(72) Inventors: Lin Feng, Shanghai (CN); Jianlong Gao, Shanghai (CN)

(73) Assignee: Southchip Semiconductor Technology (Shanghai) Co., Ltd., Shanghai (CN)

(*) Notice: Subject to any disclaimer, the term of this patent is extended or adjusted under 35 U.S.C. 154(b) by 168 days.

(21) Appl. No.: 17/955,081

(22) Filed: Sep. 28, 2022

(65) Prior Publication Data
US 2023/0291325 A1 Sep. 14, 2023

(30) Foreign Application Priority Data
Mar. 11, 2022 (CN) .......................... 202210236561.6

(51) Int. Cl.
*H02M 1/08* (2006.01)
*H02M 1/00* (2006.01)
*H02M 7/217* (2006.01)

(52) U.S. Cl.
CPC ......... *H02M 7/217* (2013.01); *H02M 1/0009* (2021.05); *H02M 1/08* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS 11,417,651 B2 * 8/2022 Li ............................ H02M 1/08
11,594,970 B2 * 2/2023 Ribarich ................. H02M 1/08
(Continued)

Primary Examiner — Jeffrey A Gblende
(74) Attorney, Agent, or Firm — JCIPRNET

(57) ABSTRACT

The present disclosure provides a power supply control circuit and control method for a switching power supply system. The control circuit includes: a power transistor and current sampling module, a voltage common collector (VCC) charging management module, a switch module, and a voltage regulator clamping module. The power transistor and current sampling module includes: a main switch high-voltage power transistor, a power transistor driver, an auxiliary sampling high-voltage transistor, and a current sampling resistor. The switch module includes a first switch, a second switch, a third switch, and a fourth switch. The present disclosure realizes time-division multiplexing and seamless transition through a reasonable timing of the switch module, thereby enabling multiplexing of high-voltage devices reducing demands for high-voltage processes, saving chip costs, and reducing design difficulty.

7 Claims, 5 Drawing Sheets

(58) Field of Classification Search
CPC ...... H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 11,711,010 B2* | 7/2023 | Sano | H03K 17/74 363/131 |
| 2023/0361115 A1* | 11/2023 | Zhang | H02M 1/36 |

* cited by examiner

POWER SUPPLY CONTROL CIRCUIT AND CONTROL METHOD FOR SWITCHING POWER SUPPLY SYSTEM

CROSS REFERENCE TO RELATED APPLICATION

This patent application claims the benefit and priority of Chinese Patent Application No. 202210236561.6, filed on Mar. 11, 2022, the disclosure of which is incorporated by reference herein in its entirety as part of the present application.

TECHNICAL FIELD

The present disclosure relates to the technical field of switching power supplies, and in particular, to a power supply control circuit and control method for a switching power supply system.

BACKGROUND ART

Taking the alternating current-direct current (AC-DC) controller as an example, after the system is powered on, the voltage common collector (VCC) of the chip needs to be charged in order to start the machine. When the VCC has a voltage higher than a certain threshold, the chip starts to work. At this time, only the input high-voltage power supply can provide voltage to the VCC, so the charging module that pre-charges the VCC shall have a withstand voltage capacity of several hundred or more volts. If this function needs to be integrated in the chip, there are relatively higher requirements on the process. The method of multi-chip co-packaging can lead to great difficulty in packaging, high cost and reduced reliability.

SUMMARY

In order to solve the above problems, the present disclosure provides a power supply control circuit and control method for a switching power supply system, so as to reduce the difficulty of packaging and save chip costs.

In order to achieve the above objective, the present disclosure provides the following technical solutions:

A power supply control circuit for a switching power supply system includes: a power transistor and current sampling module, a VCC charging management module, a switch module, and a voltage regulator clamping module.

The power transistor and current sampling module includes: a main switch high-voltage power transistor, a power transistor driver, an auxiliary sampling high-voltage transistor, and a current sampling resistor.

The switch module includes a first switch, a second switch, a third switch, and a fourth switch.

The main switch high-voltage power transistor includes a drain connected to a drain of the auxiliary sampling high-voltage transistor, a source grounded, and a gate connected to an output terminal of the power transistor driver. The auxiliary sampling high-voltage transistor includes a gate connected to one terminal of the first switch and one terminal of the second switch and a source connected to one terminal of the third switch and one terminal of the fourth switch.

The other terminal of the first switch is connected to one terminal of the voltage regulator clamping module. One terminal of the voltage regulator clamping module is further connected to an external voltage regulator clamping bias resistor, and the other terminal of the voltage regulator clamping module is grounded. The other terminal of the second switch is connected to the output terminal of the power transistor driver. The other terminal of the third switch is connected to one terminal of the VCC charging management module, and the other terminal of the VCC charging management module is connected to a power supply. The other terminal of the fourth switch is connected to one terminal of the current sampling resistor, and the other terminal of the current sampling resistor is connected to the source of the main switch high-voltage power transistor.

Optionally, the power supply control circuit for a switching power supply system may further include: an input voltage detection module. The input voltage detection module may include a voltage sampling resistor, a fifth switch, and a sixth switch. The fifth switch may include one terminal connected to one terminal of the voltage regulator clamping module and the other terminal connected to one terminal of the sixth switch and the external voltage regulator clamping bias resistor, the other terminal of the sixth switch may be connected to one terminal of the voltage sampling resistor, and the other terminal of the voltage sampling resistor may be grounded.

Optionally, the voltage regulator clamping module may include a Zener diode. The Zener diode may include an output terminal connected to the other terminal of the first switch and an input terminal connected to the power supply.

Optionally, the voltage regulator clamping module may include a Zener diode and a capacitor. The Zener diode may include an output terminal connected to the other terminal of the first switch and an input terminal connected to the power supply. The Zener diode may be connected in parallel with the capacitor.

Optionally, the VCC charging management module may include a charging diode and a controlled current source. The charging diode may include one terminal connected to the other terminal of the third switch and the other terminal connected to one terminal of the controlled current source, and the other terminal of the controlled current source may be connected to the power supply.

The present disclosure further provides a power supply control method for a switching power supply system, including:

at a startup stage of a switching power supply chip, turning on the first switch and the third switch, turning off the second switch and the fourth switch, regulating a gate voltage of the auxiliary sampling high-voltage transistor by the voltage regulator clamping module, supplying power to the VCC charging management module by the source of the auxiliary sampling high-voltage transistor, and charging the power supply by the VCC charging management module; and at a working stage of the switching power supply chip, turning on the second switch and the fourth switch, turning off the first switch and the third switch, driving and controlling the auxiliary sampling high-voltage transistor by the power transistor driver, and performing current sampling on the main switch high-voltage power transistor by the auxiliary sampling high-voltage transistor and the current sampling resistor.

The present disclosure further provides a power supply control method for a switching power supply system, including:

at a startup stage of a switching power supply chip, turning on the first switch, the third switch, and the fifth switch, turning off the second switch, the fourth switch, and the sixth switch, regulating a gate voltage of the auxiliary sampling high-voltage transistor by the voltage regulator clamping module, supplying power to the VCC charging management module by the source of the auxiliary sampling high-voltage transistor, and charging the power supply by the VCC charging management module; and at a working stage of the switching power supply chip, turning on the second switch, the fourth switch, and the sixth switch, turning off the first switch, the third switch, and the fifth switch, driving and controlling the auxiliary sampling high-voltage transistor by the power transistor driver, performing current sampling on the main switch high-voltage power transistor by the auxiliary sampling high-voltage transistor and the current sampling resistor, and sampling an input voltage by the voltage sampling resistor.

According to the specific embodiments provided by the present disclosure, the present disclosure discloses the following technical effects:

When the switching power supply chip is at different stages, time-division multiplexing and seamless transition are realized through a reasonable timing of the switch module, thereby enabling multiplexing of high-voltage devices, reducing demands for high-voltage processes, saving chip costs, and reducing design difficulty.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. Those of ordinary skill in the art may further obtain other accompanying drawings based on these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

Figure 1:
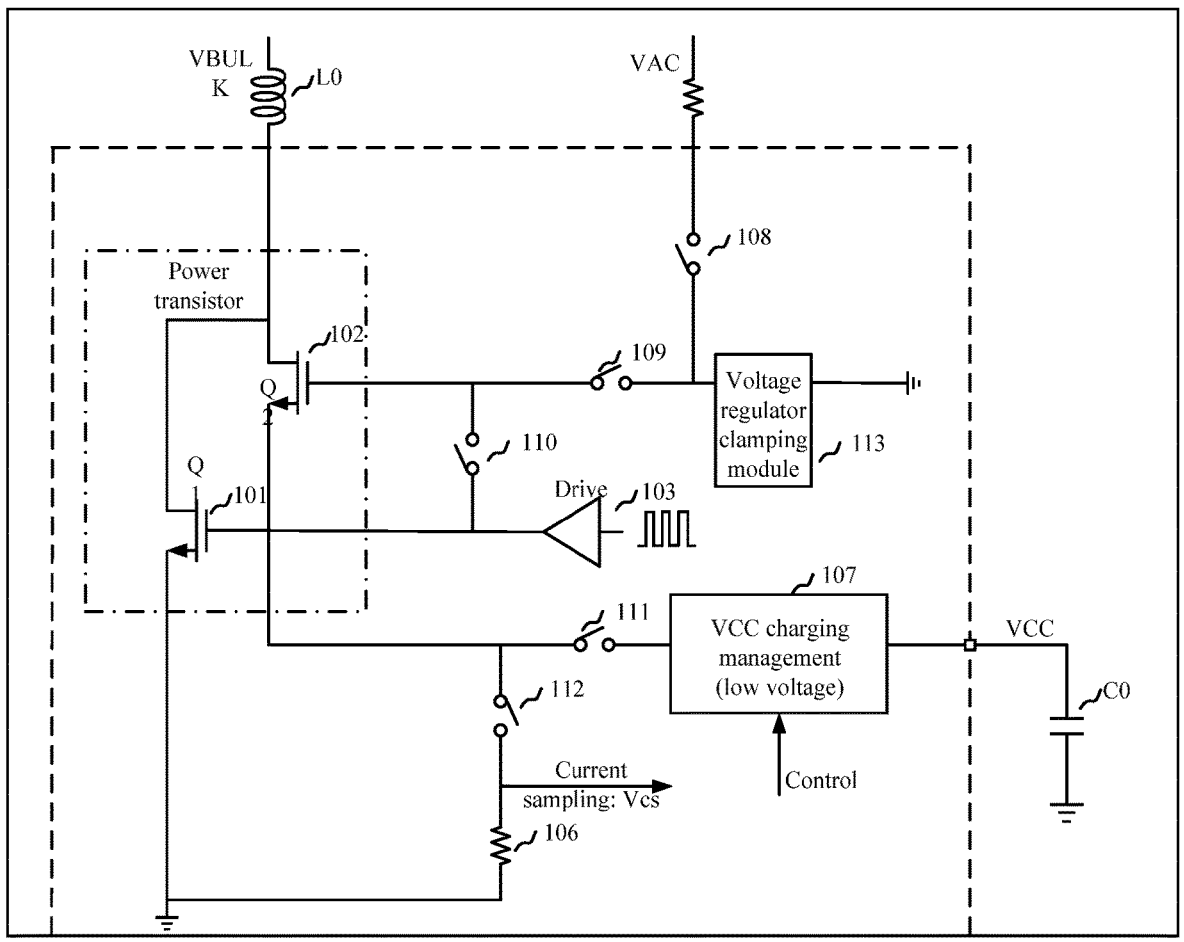
FIG. 1 is a schematic diagram of a power supply control circuit for a switching power supply system according to Embodiment I of the present disclosure.

In Embodiment I, as shown in FIG. 1, a power supply control circuit for a switching power supply system includes: a power transistor and current sampling module, a VCC charging management module 107, a switch module, and a voltage regulator clamping module 113.

The power transistor and current sampling module includes: a main switch high-voltage power transistor 101, a power transistor driver 103, an auxiliary sampling high-voltage transistor 102, and a current sampling resistor 106.

The switch module includes a first switch 109, a second switch 110, a third switch 111, and a fourth switch 112.

The main switch high-voltage power transistor 101 includes a drain connected to a drain of the auxiliary sampling high-voltage transistor 102, a source grounded, and a gate connected to an output terminal of the power transistor driver 103. The auxiliary sampling high-voltage transistor 102 includes a gate connected to one terminal of the first switch 109 and one terminal of the second switch 110 and a source connected to one terminal of the third switch 111 and one terminal of the fourth switch 112.

The other terminal of the first switch 109 is connected to one terminal of the voltage regulator clamping module 113. One terminal of the voltage regulator clamping module 113 is further connected to an external voltage regulator clamping bias resistor 114, and the other terminal of the voltage regulator clamping module 113 is grounded. The other terminal of the second switch 110 is connected to the output terminal of the power transistor driver 103. The other terminal of the third switch 111 is connected to one terminal of the VCC charging management module 107, and the other terminal of the VCC charging management module 107 is connected to a power supply VCC. The other terminal of the fourth switch 112 is connected to one terminal of the current sampling resistor 106, and the other terminal of the current sampling resistor 106 is connected to the source of the main switch high-voltage power transistor 101.

The power supply VCC is grounded after being connected in series with a capacitor C0. VAC can be equivalent to an input signal, but sometimes it may need to be rectified as an input. A VBULK signal is an input of a power conversion inductance L0. In an AC input system, taking a flyback converter as an example, L0 can be an equivalent inductance of a primary side of a transformer, and other windings of the transformer are hidden in the figure. The VAC signal in the figure is not limited to be connected to the front or back of the rectifier bridge at the AC side, and can also be connected to the drain of VBULK or Q1, depending on the application.

Figure 2:
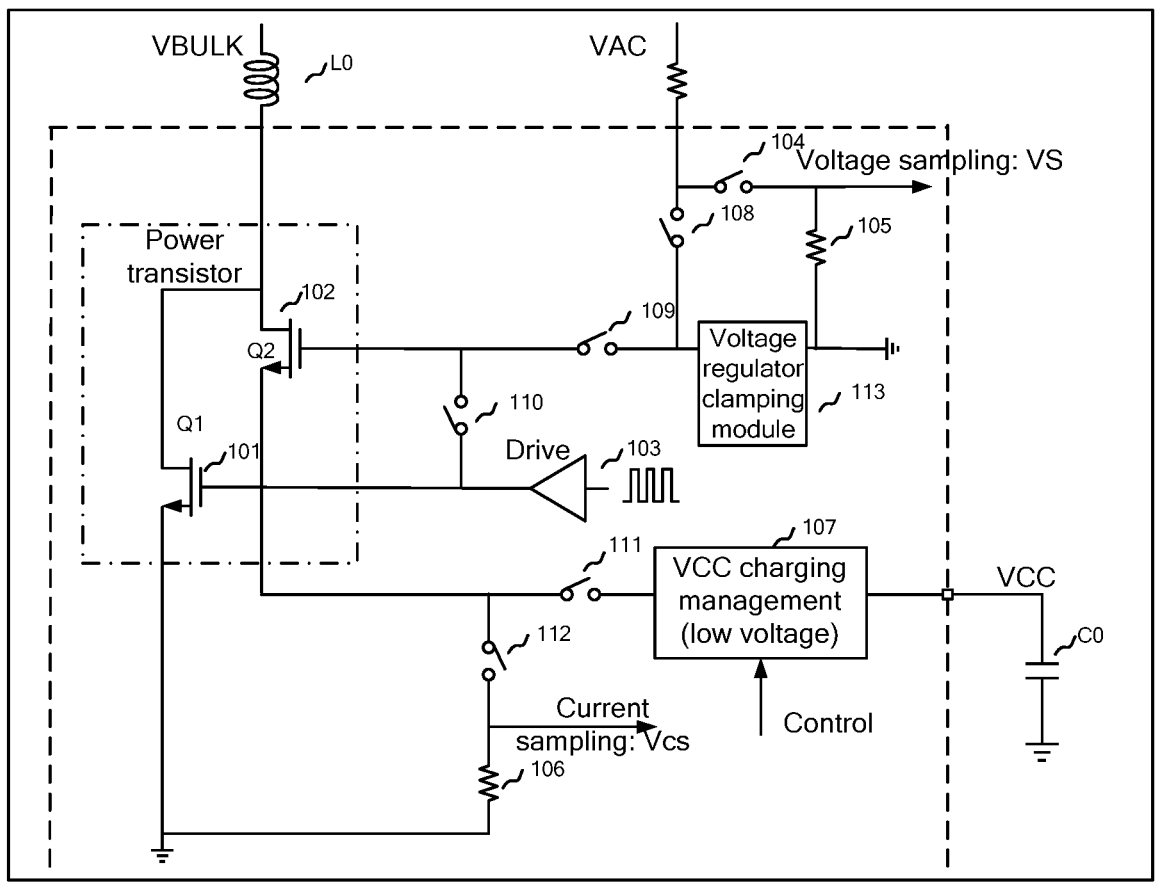
FIG. 2 is a schematic diagram of a power supply control circuit for a switching power supply system according to Embodiment II of the present disclosure.

In Embodiment II, as shown in FIG. 2, an input voltage detection module is added on the basis of Embodiment I. The input voltage detection module includes a voltage sampling resistor 105, a fifth switch 108, and a sixth switch 104. The fifth switch 108 includes one terminal connected to one terminal of the voltage regulator clamping module 113 and the other terminal connected to one terminal of the sixth switch 104 and the external voltage regulator clamping bias resistor 114, the other terminal of the sixth switch 104 is connected to one terminal of the voltage sampling resistor 105, and the other terminal of the voltage sampling resistor 105 is grounded.

The present disclosure is mainly applied to the situation where the power transistor and its current sampling need to be integrated in the same chip with the controller. Some systems that use external resistors to sample current are not described here. Compared with external sampling resistors, the integration here is higher, and there is no energy loss of sampling resistors. In order to sample the current of the main switch high-voltage power transistor Q1, the present disclosure usually makes a small auxiliary sampling high-voltage transistor Q2 to mirror the current of Q1. The voltage formed by the current of Q2 flowing through the current sampling resistor 106 represents the current information of Q1. Generally, the ratio of Q1:Q2 is very large, and the current of Q2 is much smaller than that of Q1 but proportional, such that heat will not be generated due to the introduction of the current sampling resistor 106, and the energy efficiency of the system will not be affected. Q1 and Q2 can be implemented on the same die in the same process without additional cost. The present disclosure is not limited to AC-DC systems including PFC circuits, but can also be used in direct current-direct current (DC-DC) systems. High-voltage input switching power supply conversion systems are limited by high-voltage semiconductor technology.

For the power supply control circuit for a switching power supply system in Embodiment I, the present disclosure provides a power supply control method for a switching power supply system, including the following steps.

At a startup and charging stage of a switching power supply chip, the first switch 109 and the third switch 111 are turned on, and the second switch 110 and the fourth switch 112 are turned off. At this time, the voltage regulator clamping module 113 and the VCC charging management module 107 are connected to the system to work. The voltage regulator clamping module 113 regulates a gate voltage of the auxiliary sampling high-voltage transistor 102. The voltage regulator clamping module 113 makes the gate voltage of the auxiliary sampling high-voltage transistor 102 at a level higher than the VCC and the source voltage is slightly higher than the VCC. The source voltage can supply power to the VCC charging management module 107 to charge the VCC. The voltage regulator clamping module 113 can stabilize the gate of the auxiliary sampling high-voltage transistor 102 to be slightly higher than the VCC, such as but not limited to VCC+5V, such that the source voltage of the auxiliary sampling high-voltage transistor 102 is not be too high, and the withstand voltage required by the VCC charging management module 107 is also low, so the system has less demands for high voltage. The difficulty and cost of system design is greatly saved.

At a working stage of the switching power supply chip, the second switch 110 and the fourth switch 112 are turned on, and the first switch 109 and the third switch 111 are turned off. At this time, the voltage regulator clamping module 113 and the VCC charging management module 107 do not work. The power transistor driver 103 drives and controls the auxiliary sampling high-voltage transistor 102, and the auxiliary sampling high-voltage transistor 102 and the current sampling resistor 106 perform current sampling on the main switch high-voltage power transistor 101. The gate voltage of the auxiliary sampling high-voltage transistor 102 is equal to the gate voltage waveform of the main switch high-voltage power transistor 101, the source voltage of the auxiliary sampling high-voltage transistor 102 represents the medium current of the main switch high-voltage power transistor 101, and the output Vcs represents the current waveform.

Figure 4:
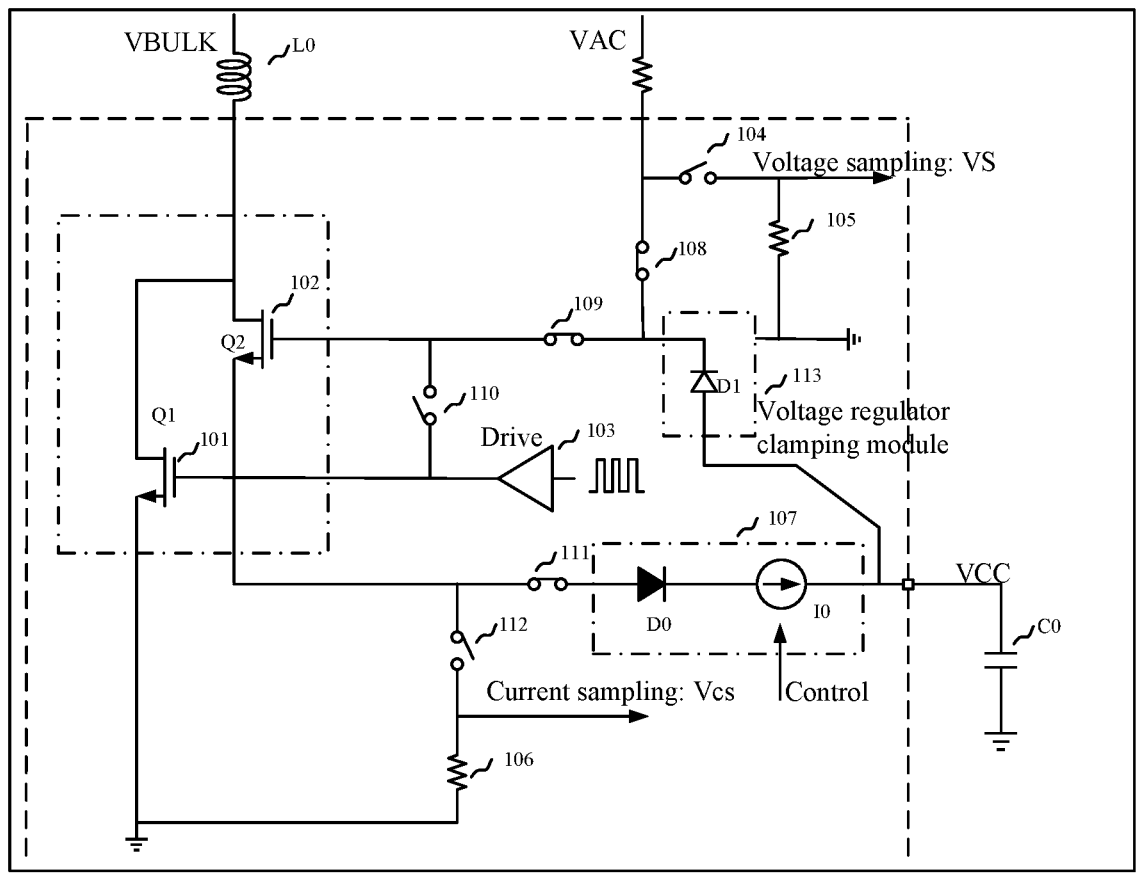
FIG. 4 is a schematic circuit diagram of a switching power supply chip at a startup and charging stage.
Figure 5:
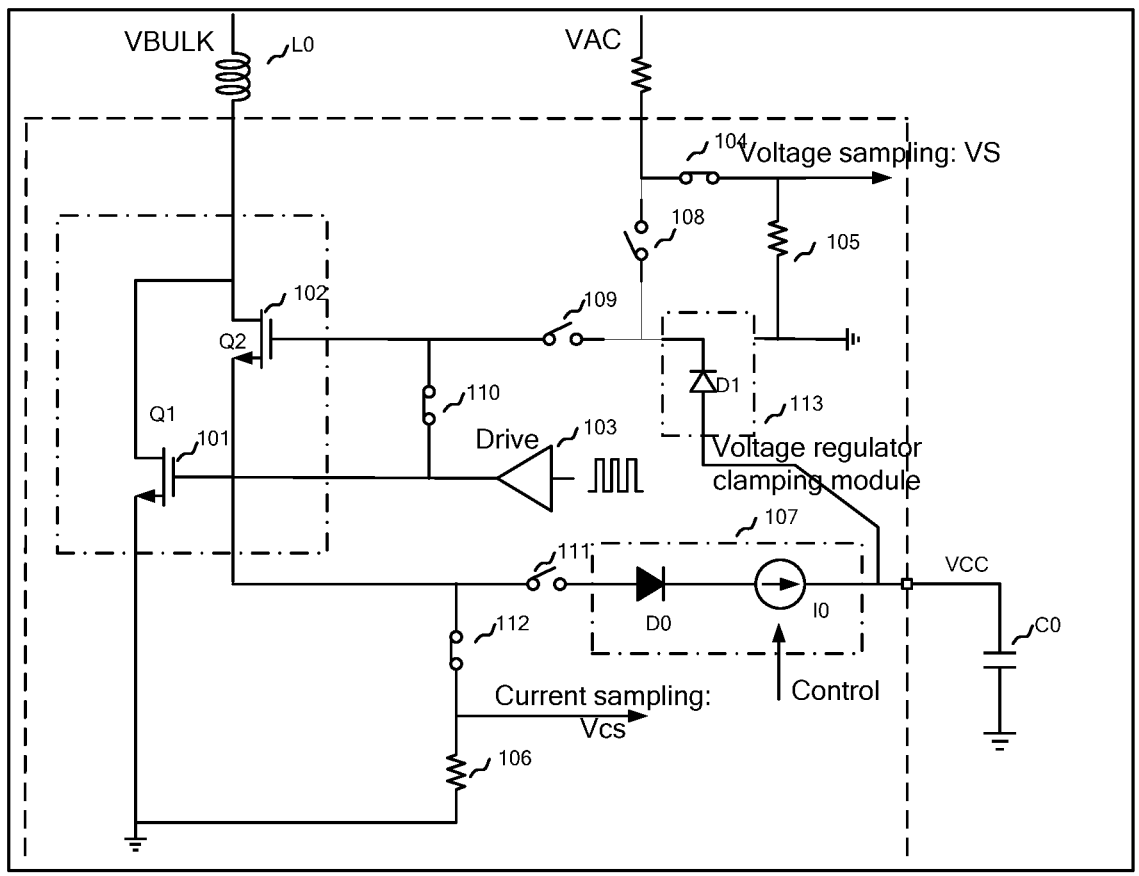
FIG. 5 is a schematic circuit diagram of the switching power supply chip at a working stage.

For the power supply control circuit for a switching power supply system in Embodiment II, the present disclosure provides a power supply control method for a switching power supply system. FIG. 4 and FIG. 5 are schematic circuit diagrams of a switching power supply chip at a startup and charging stage and a working stage after startup respectively. The voltage regulator clamping module 113 can be simply implemented by the Zener diode D1, or a capacitor can be connected in parallel with D1. The Zener diode D1 can be clamped to ground or connected to VCC clamp. In reality, according to the process, it is not limited to the Zener diode, and other circuits can also implement the voltage regulator clamping function. The gate voltage of the auxiliary sampling high-voltage transistor 102 is $G\_Q2=VCC+Vz$. Vz represents the breakdown voltage of the Zener diode. The VCC charging management module 107 is implemented by the combination of a charging diode D0 and a controlled current source I0. Due to the semiconductor process, D0 is often required to prevent the VCC from forming a reverse current inside the chip after charging. I0 is the controlled current source, and the magnitude of its current is controlled by a Control signal, which is given by the chip. The control of I0 is to prevent chip abnormality caused by excessive charging and to zero the current when necessary.

At a startup stage of the switching power supply chip, the VCC needs to be charged first. At this time, the second switch 110, the fourth switch 112, and the sixth switch 104 are in an off state, and the first switch 109, the third switch 111, and the fifth switch 108 are in an on state. At this time, the voltage regulator clamping module 113 and the VCC charging management module 107 are connected to the system to work. The voltage regulator clamping module 113 makes the voltage of the gate G of the auxiliary sampling high-voltage transistor 102 at a level higher than the VCC by Vz, and the source voltage of the auxiliary sampling high-voltage transistor 102 is slightly higher than the VCC. The source voltage of the auxiliary sampling high-voltage transistor 102 can supply power to the VCC charging management module 107 to charge the VCC.

At the current stage, the chip will not be fully enabled, and the main switch high-voltage power transistor 101 will not be in a switch state. At this time, it is not necessary to sample the current information Vcs of the main switch high-voltage power transistor 101. Then, each functional module is used to reasonably set the appropriate timing, and the auxiliary sampling high-voltage transistor 102 is used to charge the VCC from the high-voltage input VBULK without a high-voltage charging module. The VCC charging management module 107 is directly connected to the source of the auxiliary sampling high-voltage transistor 102.

FIG. 5 corresponds to a working stage of the chip after startup. The second switch 110, the fourth switch 112, and the sixth switch 104 are switched to the on state, and the first switch 109, the third switch 111, and the fifth switch 108 are switched to the off state. At this time, the voltage regulator clamping module 113 and the VCC charging management module 107 do not work. The power transistor driver 103 drives and controls the auxiliary sampling high-voltage transistor 102, and its gate voltage is equal to the gate waveform of the main switch high-voltage power transistor 101. The source of the auxiliary sampling high-voltage transistor 102 is connected to the current sampling resistor 106, and the source voltage of the auxiliary sampling high-voltage transistor 102 represents the medium current information of the main switch high-voltage power transistor 101. The output Vcs represents the current information waveform.

When the chip VCC is powered on normally, the VCC meets the voltage required for normal operation. At this time, the VCC charging management module 107 will not work, and there is no need to charge the VCC again. The main switch high-voltage power transistor 101 is in a switch state, and the system is in the process of transferring energy from input to output. At this time, the chip is in the adjustment state, and real-time current information in the main switch high-voltage power transistor 101 needs to be sampled in time. The auxiliary sampling high-voltage transistor 102 and the current sampling resistor 106 need to work together to output the current sampling information Vcs in real time.

After the chip is powered on normally, the input voltage sampling function also needs to be enabled, and the input voltage information needs to be provided to the chip system to assist the chip system control. At this time, the voltage regulator clamping module 113 does not need to be in the working state, the external voltage regulator clamping bias resistor 114 and the sixth switch 104 are connected in series, and the voltage sampling resistor 105 samples the input voltage.

Figure 3:
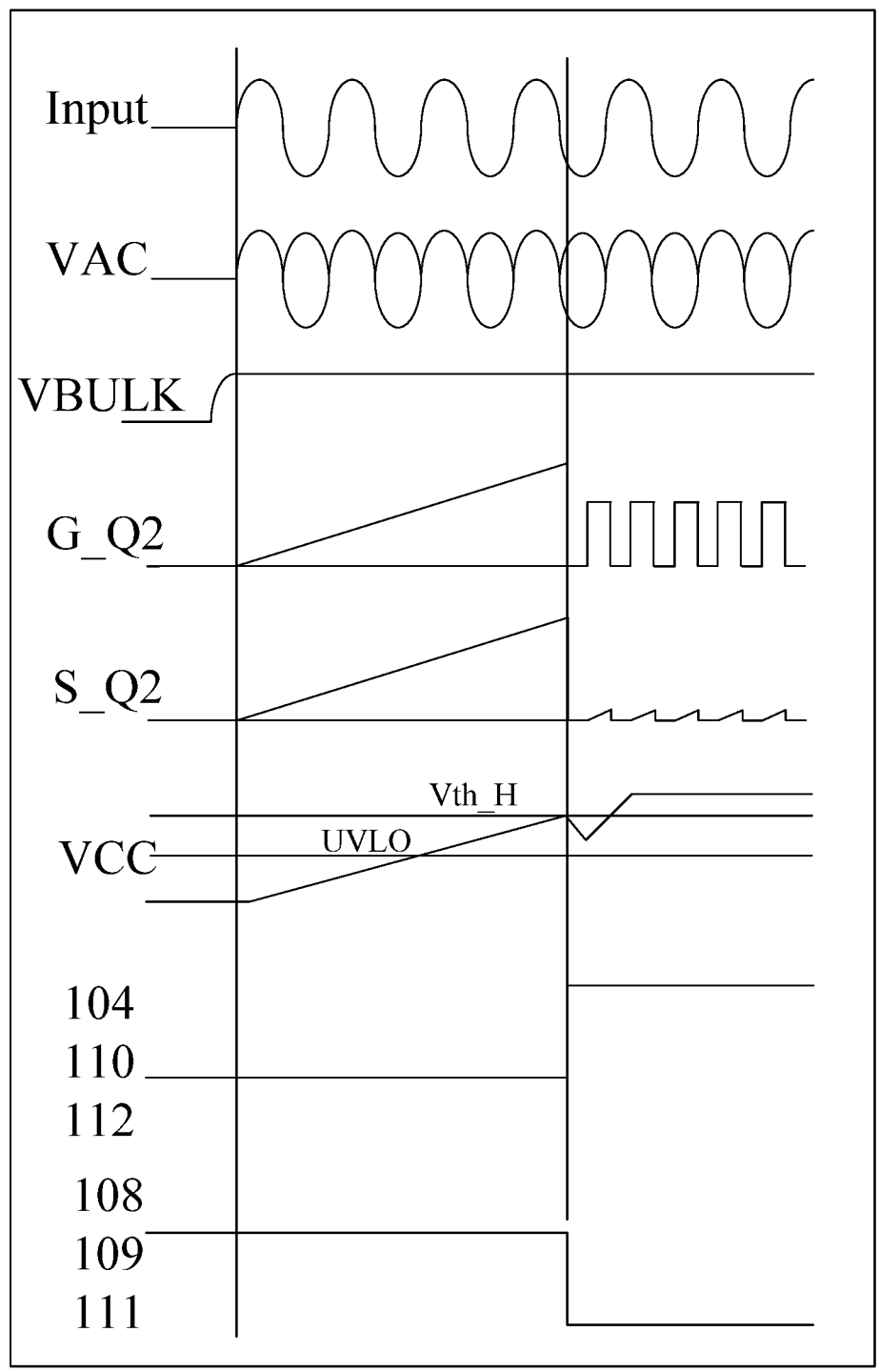
FIG. 3 is a schematic diagram of a control timing.

FIG. 3 is a schematic diagram of a control timing of the present disclosure. As shown in FIG. 3, the input signal refers to the high-voltage input of the system, which can be an AC signal or a DC signal. Here, only a common AC input signal is taken as an example, but it is not limited to this. VAC can be equivalent to the input signal, but sometimes it may need to be rectified as an input. The dotted line in the figure represents two possibilities, one is equivalent to the input signal, and the other is a steamed bun wave-like signal obtained after the input signal is rectified. The VBULK signal is the input of the power conversion inductance L0. In the AC input system, taking the flyback converter as an example, L0 can be the equivalent inductance of the primary side of the transformer, and other windings of the transformer are hidden in the figure. The voltage waveform is an approximate DC signal obtained by bridge rectification of the input signal, but VBULK will fluctuate periodically with the input voltage under heavy load. Especially in an automatic power factor correction (APFC) system, in order to improve the power factor, the capacitor after bridge rectification is very small or there is no capacitor to store energy, and the VBULK voltage will be similar to the steamed bun wave. G_Q2 and S_Q2 refer to gate and source voltage waveforms of the auxiliary sampling high-voltage transistor 102 respectively. In the voltage waveform of the VCC, the control system generally charges the VCC to a preset voltage threshold Vth_H first. At this time, the system considers that the VCC has reached the normal working condition and it is no longer necessary to charge the VCC. The last two voltage waveforms represent the control logic of the first switch 109, the second switch 110, the third switch 111, the fourth switch 112, the fifth switch 108, and the sixth switch 104. A high level indicates that the switch is in the on state, whereas a low level indicates that the switch is in the off state.

As shown in FIG. 3, before the VCC reaches the preset threshold Vth_H, the chip is in a startup state. At this time, the VCC needs to be charged, the second switch 110, the fourth switch 112, and the sixth switch 104 are in the off state, and the first switch 109, the third switch 111, and the fifth switch 108 are in the on state. At this time, the voltage regulator clamping module 113 and the VCC charging management module 107 are connected to the system to work. The voltage regulator clamping module 113 makes the gate G_Q2 of the auxiliary sampling high-voltage transistor 102 at a level higher than the VCC by a value determined according to the device type and size of the selected auxiliary sampling high-voltage transistor 102, such that it meets the following conditions in this state: the device is in a safe working area, and S_Q2 is slightly higher than the VCC. Then S_Q2 can supply power to the high-voltage charging module to charge the VCC. If the safe working area of the device allows, G_Q2 can also be directly regulated to a fixed voltage to reduce the design complexity.

When the VCC reaches the preset threshold Vth_H, the chip startup is completed. At this time, the system does not need to charge the VCC, the second switch 110, the fourth switch 112, and the sixth switch 104 are switched to the on state, and the first switch 109, the third switch 111, and the fifth switch 108 are switched to the off state. At this time, the voltage regulator clamping module 113 and the VCC charging management module 107 do not work. The power transistor driver 103 drives and controls the auxiliary sampling high-voltage transistor 102, and its G_Q2 is equal to the gate waveform of the main switch high-voltage power transistor 101. The source of the auxiliary sampling high-voltage transistor 102 is connected to the current sampling resistor 106, and the voltage of S_Q2 represents the medium current information of the main switch high-voltage power transistor 101. The output Vcs represents the current information waveform. It is not unique that the back-end voltage of VCC becomes high. In general systems, the general output setup process will also supply power to the VCC through other paths, such as a flyback converter. After the VCC is started, power will be supplied to the VCC through the auxiliary winding. At this time, the VCC will generally be slightly higher.

The present disclosure utilizes the idle feature of the current sampling high-voltage power transistor at the startup stage by timing time-division control, multiplexes the withstand voltage of the current sampling high-voltage transistor, and charges the power supply VCC, thereby saving the high-voltage charging circuit required for conventional charging and reducing chip costs and design complexity.

Each embodiment of the present specification is described in a progressive manner, each embodiment focuses on the difference from other embodiments, and the same and similar parts between the embodiments may refer to each other.

Some specific examples are used for illustration of the principles and implementations of the present disclosure herein. The description of the foregoing embodiments is used to help illustrate the method of the present disclosure and the core ideas thereof. In addition, those of ordinary skill in the art can make various modifications in terms of specific implementations and the scope of application in accordance with the ideas of the present disclosure. In conclusion, the content of the present description shall not be construed as limitations to the present disclosure.

What is claimed is:

1. A power supply control circuit for a switching power supply system, comprising: a power transistor and current sampling module, a voltage common collector (VCC) charging management module, a switch module, and a voltage regulator clamping module, wherein
the power transistor and current sampling module comprises: a main switch high-voltage power transistor, a power transistor driver, an auxiliary sampling high-voltage transistor, and a current sampling resistor;
the switch module comprises a first switch, a second switch, a third switch, and a fourth switch;
the main switch high-voltage power transistor comprises a drain connected to a drain of the auxiliary sampling high-voltage transistor, a source grounded, and a gate connected to an output terminal of the power transistor driver; and the auxiliary sampling high-voltage transistor comprises a gate connected to one terminal of the first switch and one terminal of the second switch and a source connected to one terminal of the third switch and one terminal of the fourth switch; and
an other terminal of the first switch is connected to one terminal of the voltage regulator clamping module; the one terminal of the voltage regulator clamping module is further connected to an external voltage regulator clamping bias resistor, and an other terminal of the voltage regulator clamping module is grounded; an other terminal of the second switch is connected to the output terminal of the power transistor driver; an other terminal of the third switch is connected to one terminal of the VCC charging management module, and an other terminal of the VCC charging management module is connected to a power supply; and an other terminal of the fourth switch is connected to one terminal of the current sampling resistor, and an other terminal of the current sampling resistor is connected to the source of the main switch high-voltage power transistor.

2. The power supply control circuit for a switching power supply system according to claim 1, further comprising: an input voltage detection module, wherein the input voltage detection module comprises a voltage sampling resistor, a fifth switch, and a sixth switch; and the fifth switch comprises one terminal connected to the one terminal of the voltage regulator clamping module and an other terminal connected to one terminal of the sixth switch and the external voltage regulator clamping bias resistor, an other terminal of the sixth switch is connected to one terminal of the voltage sampling resistor, and an other terminal of the voltage sampling resistor is grounded.

3. The power supply control circuit for a switching power supply system according to claim 1, wherein the voltage regulator clamping module comprises a Zener diode; and the Zener diode comprises an output terminal connected to the other terminal of the first switch and an input terminal connected to the power supply.

4. The power supply control circuit for a switching power supply system according to claim 1, wherein the voltage regulator clamping module comprises a Zener diode and a capacitor; the Zener diode comprises an output terminal connected to the other terminal of the first switch and an input terminal connected to the power supply; and the Zener diode is connected in parallel with the capacitor.

5. The power supply control circuit for a switching power supply system according to claim 1, wherein the VCC charging management module comprises a charging diode and a controlled current source; and the charging diode comprises one terminal connected to the other terminal of the third switch and an other terminal connected to one terminal of the controlled current source, and an other terminal of the controlled current source is connected to the power supply.

6. A power supply control method for a switching power supply system, applied to the power supply control circuit for a switching power supply system according to claim 1, and comprising:
at a startup stage of a switching power supply chip, turning on the first switch and the third switch, turning off the second switch and the fourth switch, regulating a gate voltage of the auxiliary sampling high-voltage transistor by the voltage regulator clamping module, supplying power to the VCC charging management module by the source of the auxiliary sampling high-voltage transistor, and charging the power supply by the VCC charging management module; and
at a working stage of the switching power supply chip, turning on the second switch and the fourth switch, turning off the first switch and the third switch, driving and controlling the auxiliary sampling high-voltage transistor by the power transistor driver, and performing current sampling on the main switch high-voltage power transistor by the auxiliary sampling high-voltage transistor and the current sampling resistor.

7. A power supply control method for a switching power supply system, applied to the power supply control circuit for a switching power supply system according to claim 2, and comprising:
at a startup stage of a switching power supply chip, turning on the first switch, the third switch, and the fifth switch, turning off the second switch, the fourth switch, and the sixth switch, regulating a gate voltage of the auxiliary sampling high-voltage transistor by the voltage regulator clamping module, supplying power to the VCC charging management module by the source of the auxiliary sampling high-voltage transistor, and charging the power supply by the VCC charging management module; and
at a working stage of the switching power supply chip, turning on the second switch, the fourth switch, and the sixth switch, turning off the first switch, the third switch, and the fifth switch, driving and controlling the auxiliary sampling high-voltage transistor by the power transistor driver, performing current sampling on the main switch high-voltage power transistor by the auxiliary sampling high-voltage transistor and the current sampling resistor, and sampling an input voltage by the voltage sampling resistor.

\* \* \* \* \*